Nov. 20, 1962 G. L. SHELTON, JR 3,064,519

SPECIMEN IDENTIFICATION APPARATUS AND METHOD

Filed May 16, 1960 5 Sheets-Sheet 1

INVENTOR
GLENMORE L. SHELTON, JR.

BY Francis J. Thomas
ATTORNEY

Nov. 20, 1962 G. L. SHELTON, JR 3,064,519

SPECIMEN IDENTIFICATION APPARATUS AND METHOD

Filed May 16, 1960 5 Sheets-Sheet 2

SPECIMEN IDENTIFICATION APPARATUS AND METHOD

Nov. 20, 1962 G. L. SHELTON, JR 3,064,519

SPECIMEN IDENTIFICATION APPARATUS AND METHOD

Filed May 16, 1960 5 Sheets-Sheet 4

Nov. 20, 1962 G. L. SHELTON, JR 3,064,519

SPECIMEN IDENTIFICATION APPARATUS AND METHOD

Filed May 16, 1960 5 Sheets-Sheet 5

United States Patent Office 3,064,519
Patented Nov. 20, 1962

3,064,519

SPECIMEN IDENTIFICATION APPARATUS AND METHOD

Glenmore L. Shelton, Jr., Mahopac, N.Y., assignor to International Business Machines Corporation, New York, N.Y., a corporation of New York Filed May 16, 1960, Ser. No. 29,392
9 Claims. (Cl. 88—1)

This invention relates to specimen identification and in particular, to specimen identification apparatus and methods wherein Fourier transforms of specimens to be identified are compared to Fourier transforms of reference patterns.

Fourier transforms can be obtained in several ways: for example, they may be computed electronically or obtained optically by generating Fraunhofer diffraction patterns. This application employs an optical embodiment for demonstrating the present invention.

Optical specimen identification devices in the prior art make use of direct comparison between the specimen to be identified and reference patterns. Either vertical or horizontal misregistration of the specimen affects the comparison in these devices. The present invention uses optical Fraunhofer diffraction patterns which are inherently registration in variant and overcomes this problem. Since Fraunhofer diffraction patterns are optical realizations of Fourier transforms, all of the advantages of operating with Fourier transforms of the specimen data rather than with the specimen data itself, may be put to use. Imperfect-specimen identification is not hampered by comparison of diffraction patterns rather than comparison of the specimens themselves.

A primary object of this invention is to provide a specimen identification apparatus and method making use of Fraunhofer diffraction pattern (Fourier transform) comparison.

Another object is to provide a specimen identification apparatus and method that is registration invariant and also has a high degree of insensitivity to imperfect specimens.

A further object is to provide a specimen identification apparatus and method that is capable of identifying various-sized specimens.

These and other objects are achieved by optically producing a Fraunhofer diffraction pattern of the specimen to be identified, and then optically comparing the diffraction pattern with diffraction patterns of reference patterns using a masking technique. Photoelectric cells are used to measure the light obtained by each comparison of the diffraction pattern of the specimen with the reference diffraction patterns. The reference diffraction pattern that is most similar to the diffraction pattern of the specimen produces the maximum photoelectric cell output and determines identification.

The foregoing and other objects, features and advantages of the invention will be apparent from the following more particular description of the invention, as illustrated in the accompanying drawings.

FIGURE 3 and FIGURES 3*a*, 3*b* and 3*c* are parts of a circuit diagram of the maximum signal indicator used in connection with the apparatus.

Figures 3, 3C, 4:
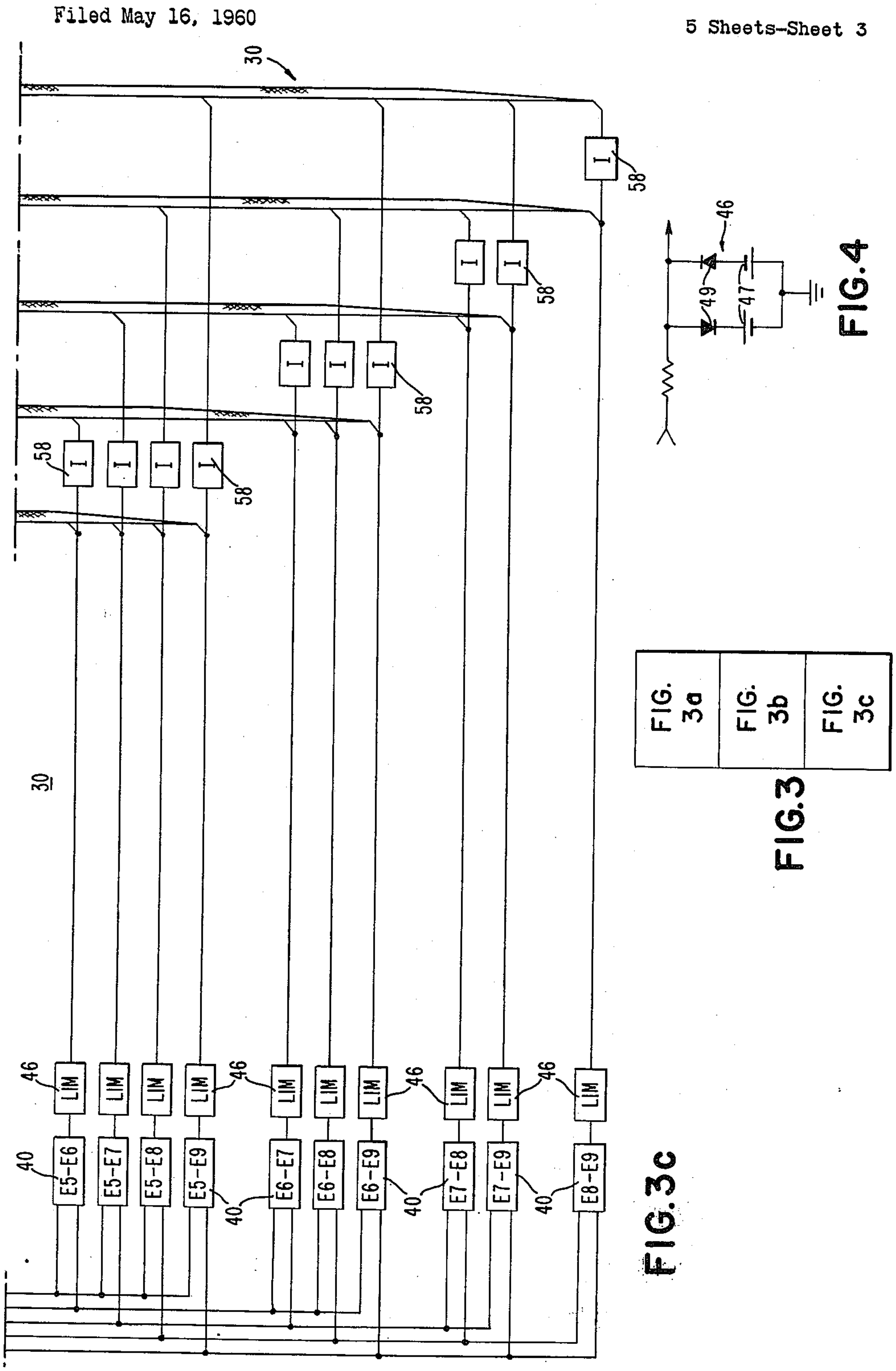
Figure 3A:
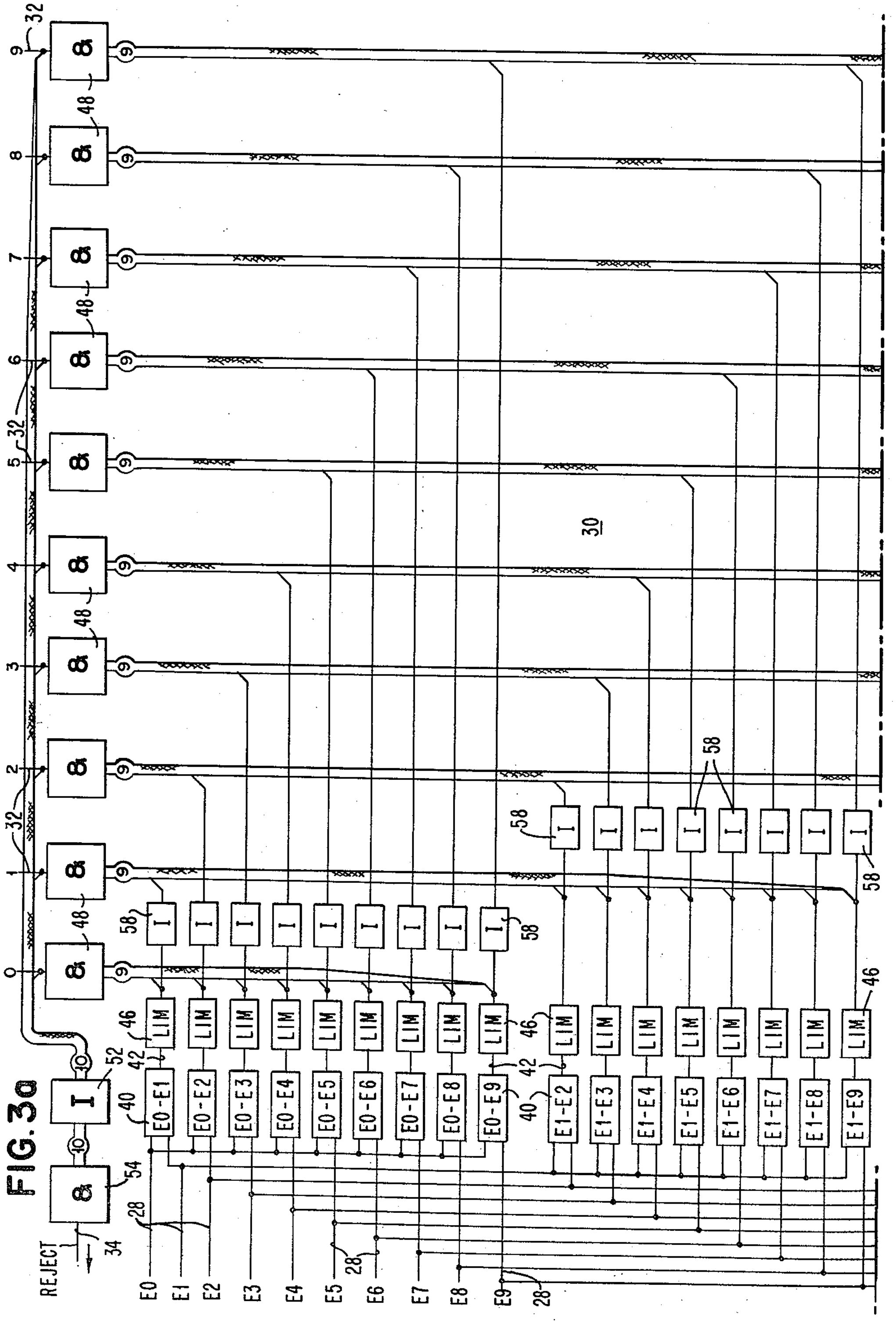
Figure 3B:
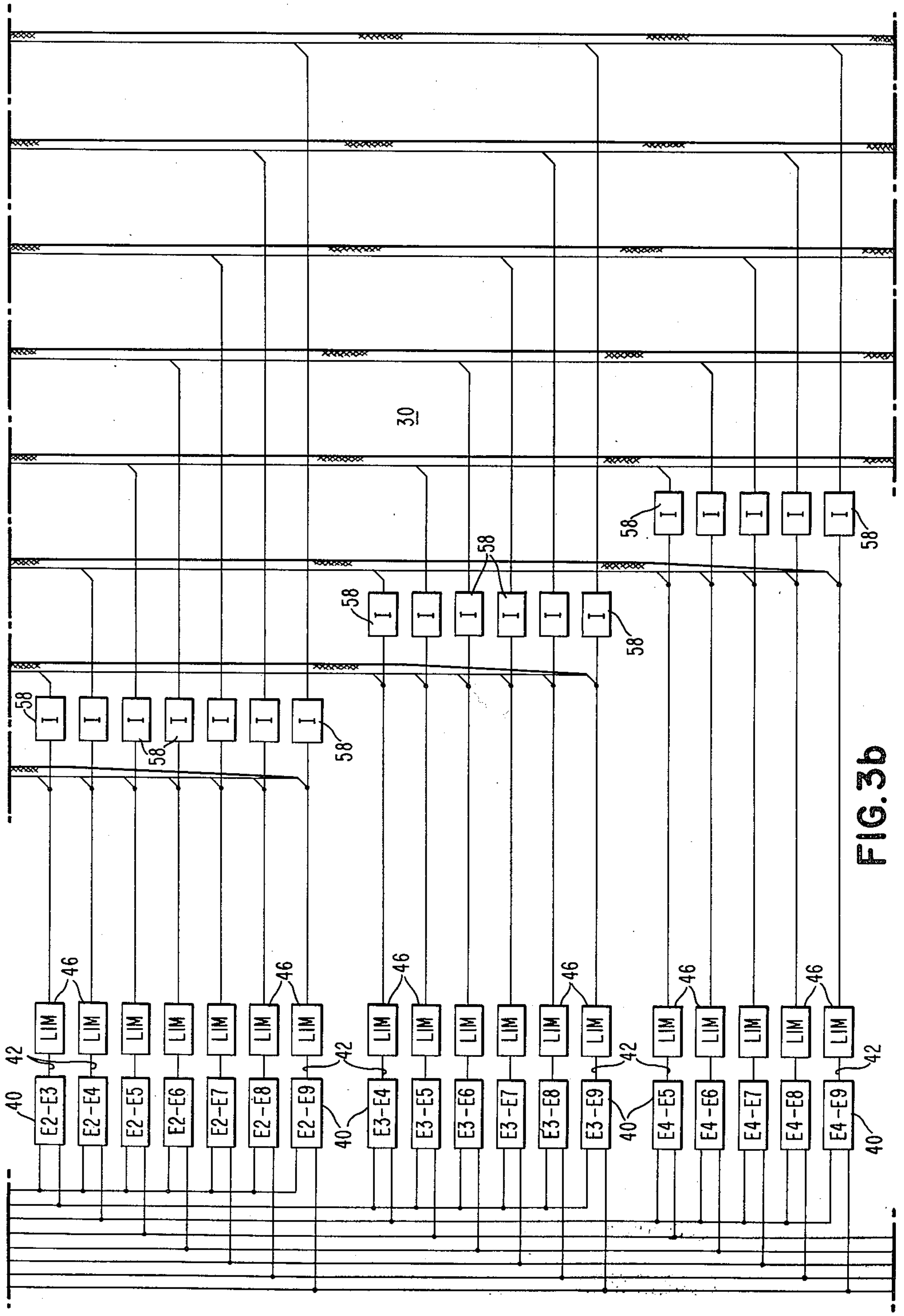

FIGURE 4 is a circuit diagram of the limiter circuit used in connection with the circuit of FIGURE 3.

A text authored by George Joos and entitled Theoretical Physics provides a mathematical discussion of Fraunhofer patterns showing them to be Fourier transforms of the input specimen. This text is available in the Library of Congress, classification QC 20.J62, 1958, pages 379–390.

Figure 1:
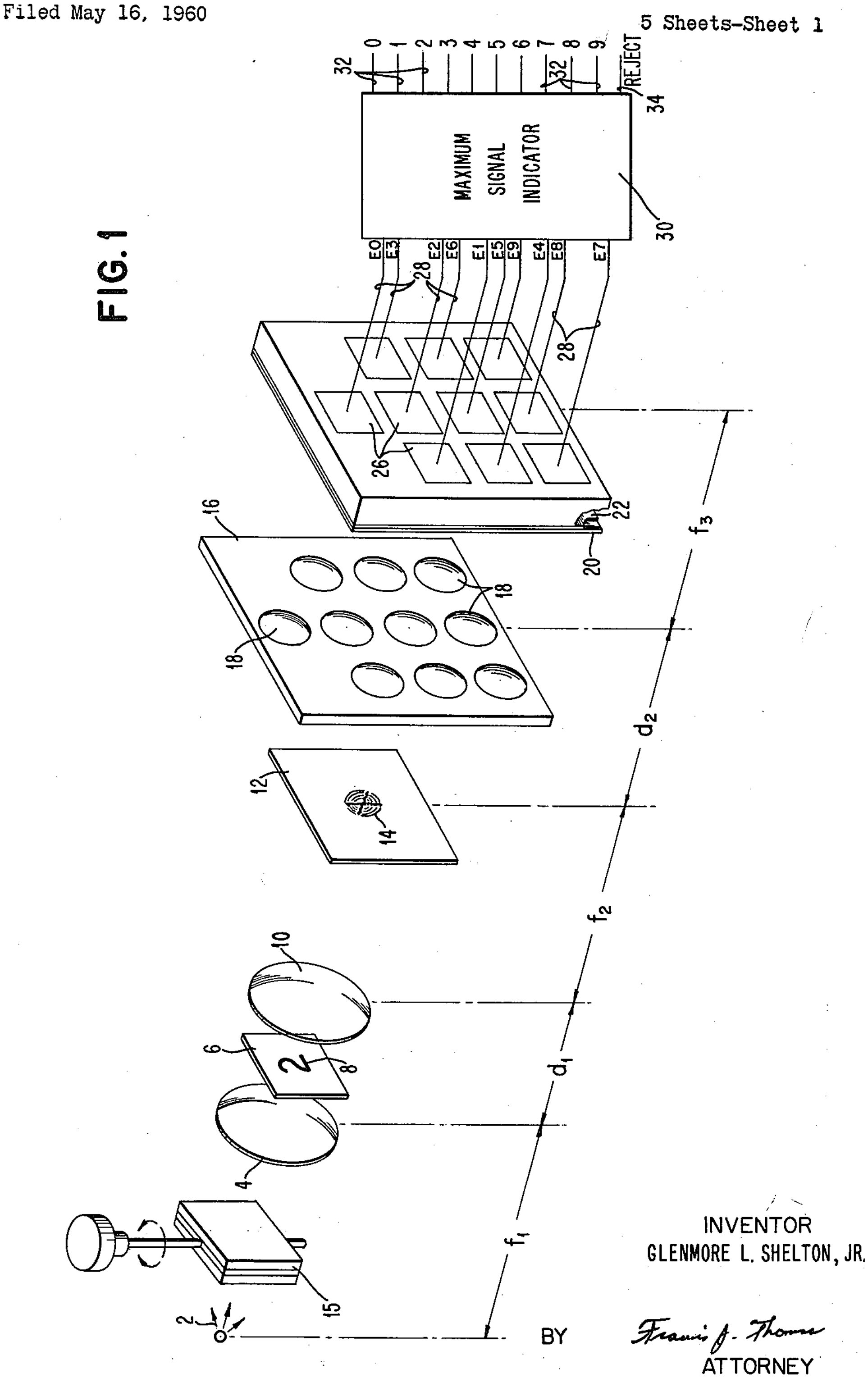
FIGURE 1 is a functional diagram of apparatus embodying the invention.

Specimen identification apparatus making use of Fraunhofer diffraction patterns is shown in FIGURE 1. This embodiment shows an equipment used to identify arabic numerals; however, it is not to be considered exclusively limited to this use. A monochromatic point source of light 2, located at a distance ($f_1$) from a lens 4 equal to the focal length of the lens, applies coherent light to the input specimen transparency 6. The transparency 6 contains an input specimen designated by the label 8. The input specimen can be relatively transparent on a relatively opaque background or relatively opaque on a relatively transparent background as shown. The diffraction pattern photographs illustrated in FIGURE 2 were obtained using transparent reference patterns with opaque backgrounds. Again referring to FIGURE 1, a second lens 10 directs the light energy from the input specimen transparency 6 to a frosted glass plate 12. The distance $d_1$ between the lenses 4 and 10 is not critical as the light passing between them is collimated. On the other hand, the frosted glass plate 12 is located at a distance ($f_2$) from lens 10, which distance is equal to the focal length of this lens. A diffraction pattern 14 for the input specimen 8 is developed on the frosted glass plate. Regardless of the location of the input specimen on the transparency, the diffraction pattern appears at the same place on the frosted glass plate. This phenomena permits misregistered as well as accurately registered input specimens to be identified equally well. Use of diffraction pattern identification thus provides inherent registration invariance. A more detailed discussion of Fraunhofer diffraction patterns may be found in a text authorized by Francis Webster Sears, Optics, 1949, Library of Congress classification QC 355.S45, chapter 9. Registration invariance phenomena of such patterns is shown on page 233 of of this reference.

The size of the diffraction pattern 14 is dependent upon the frequency of light applied to the input specimen 8. Various-sized input specimens are accommodated by adjusting the frequency of applied light by the use of an interference filter 15. An interference filter passes one band of light frequencies and rejects others. The band of frequencies passed is dependent upon its physical construction as explained in a book authored by Francis A. Jenkins and Harvey E. White entitled Fundamentals of Optics, 1957, Library of Congress classification number QC 355.J4, pages 284 and 285. FIGURE 14S of this reference (page 285) shows the construction of a simple interference filter. The frequency band passed by the filter 15 is dependent upon the angle of incidence of the applied light. In the device of FIGURE 1, this angle is adjustable. Since the size of the diffraction pattern 14 is dependent upon the frequency of light applied to the input specimen 8, the device in FIGURE 1 accommodates a range of input specimen sizes. The interference filter 15 could be oscillated mechanically to cause the diffraction pattern to fluctuate in size and provide automatic specimen-size compensation. Similarly, a servo system could be used to automatically control the position of the interference filter to that which would provide optimum identification.

Figure 2:
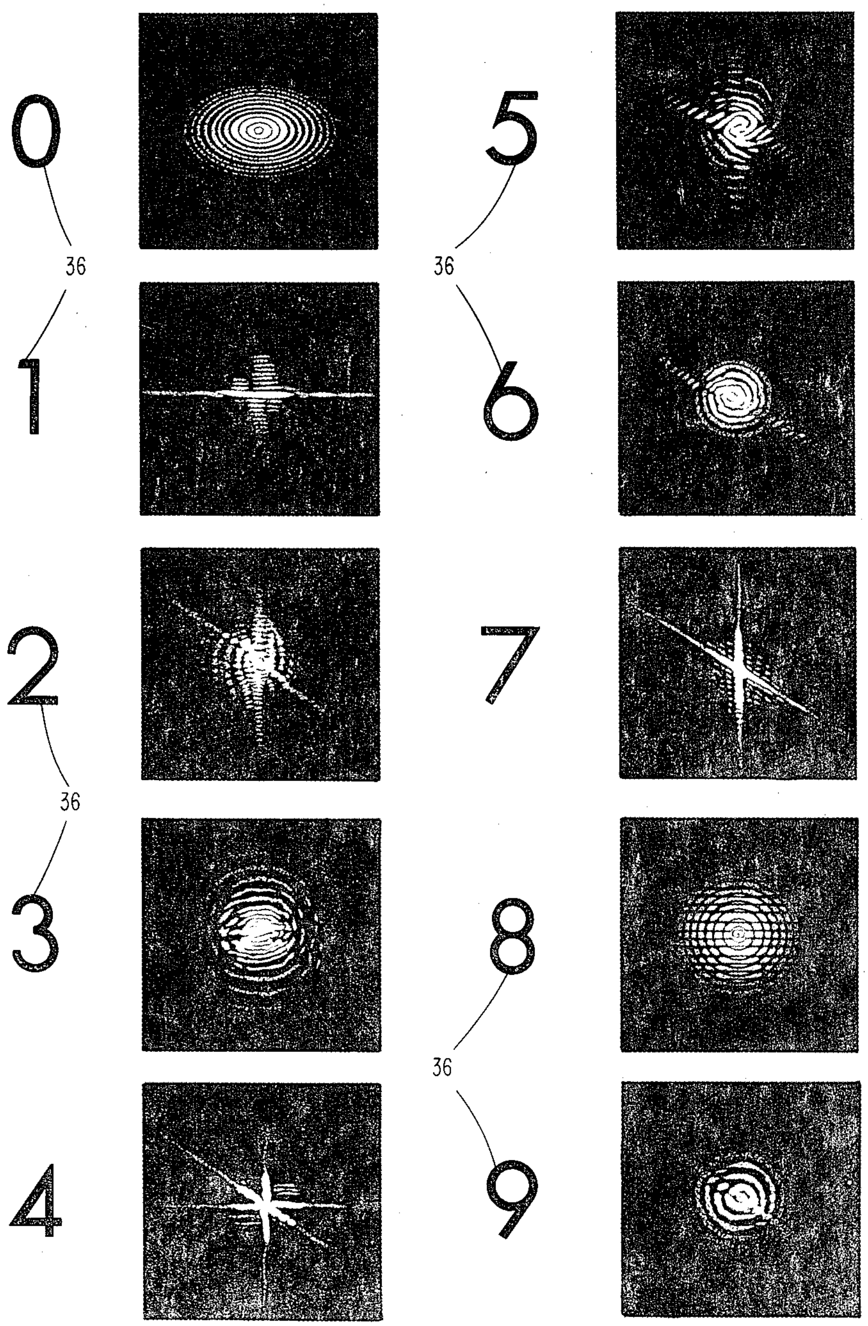
FIGURE 2 is a set of reference diffraction pattern photographs for arabic numeral specimens.

In order to simultaneously compare the diffraction pattern 14 with ten reference diffraction patterns, as is required for arabic numerals, a plate 16 containing ten lenses 18 is used to direct the pattern 14 toward ten reference diffraction pattern masks mounted on a plate 20. The masks themselves are not visible in the figure. These masks are relatively opaque with relatively transparent portions, as shown in FIGURE 2, as are required with transparent input patterns. Distance $f_3$ equals the focal length of lenses 18. Distance $d_2$, the positions and angles of tilt of lenses 18, distance $f_3$, and the positions of the diffraction masks are dependent and the device is constructed to cause the diffraction pattern 14 to be superimposed upon the reference diffraction patterns on plate 20. An alternative method of compensating for various input specimen 8 sizes consists in making the distances, angles, and positions adjustable. The light passing through the reference masks is directed through normalization masks on a plate 22 (to be discussed below) to a bank of photoelectric cells containing ten cells 26. Each cell provides an output voltage on a lead 28 proportional to the amount of light impinging upon it. A maximum signal indicator circuit 30 provides a signal on one of ten output leads to identify the specimen 8. The circuit 30 is described in detail hereafter in connection with FIGURES 3 and 4. As will be discussed with respect to FIGURE 3, a reject output lead 34 is also provided to indicate that the specimen 8 does not closely match any one of the reference patterns.

Serial comparison could be used instead of simultaneous (parallel) comparison by successively comparing the diffraction pattern of the specimen with reference diffraction patterns. Alternatively, several photoelectric cells could be placed at selected positions behind the frosted glass plate 4. In this embodiment, the intensity of light at these selected positions is compared to reference intensities to identify the specimen.

The normalization masks located on plate 22 are uniformly semitransparent (gray) and one is located between each photoelectric cell and its corresponding diffraction mask. The normalization masks insure that each ideal input pattern causes more light to impinge upon its corresponding photoelectric cell than is caused by non-corresponding ideal input patterns. The correct opacity for each normalization mask can easily be achieved by using variable-opacity elements and ideal input patterns. One simple variable-opacity device consists of two polarized sheets mounted on a center axis. As one sheet is rotated with respect to the other, the amount of light passing through the sheets is varied.

The setting of the variable-opacity elements is determined by the following procedure:

(1) Set all variable-opacity elements to minimum opacity.

(2) Measure the current through the corresponding photoelectric cell for each reference pattern.

(3) Using the reference pattern that developed the least current, measure the current through the non-corresponding photoelectric cells. If all currents measured are not substantially lower (e.g. 10%) than the current through the corresponding cell, increase the opacity of the appropriate channels until this condition is met.

(4) Repeat the procedure in step 3 using the reference pattern that developed the second lowest current in step 2. If this step indicates the need of more opacity in the channel corresponding to the reference pattern used in step 3, repeat step 3 decreasing the correlation tolerance (e.g. to 8%) by decreasing the opacity of the channel providing the second-lowest current in step 2. This procedure must be repeated until a tolerance is found that provides proper operation of both channels (i.e. both reference patterns develop substantially more current through their respective photoelectric cells than through any other cells.)

(5) Repeat the procedure in step 3 using the remainder of the reference patterns in order determined by the currents measured in step 2. It may be necessary to return to step 3 and repeat completed work several times, reducing the tolerance each time, before all channels operate properly.

FIGURE 2 shows the diffraction patterns that ideal input patterns 36 produce on the frosted glass plate 12 (FIGURE 1). To see these difffraction patterns on the device of FIGURE 1, one would look at the frosted glass plate from the direction of the light source. If one were to look at the other side of the frosted glass plate, the diffraction patterns would be reversed. Positive transparencies of the photographs in FIGURE 2 are used as the reference diffraction pattern masks required in FIGURE 1.

FIGURE 3 shows a maximum signal indicator 30 that may be used in the apparatus of FIGURE 1. D.C. voltage inputs are applied on leads 28 from photoelectric cells 26 of FIGURE 1. The purpose of the maximum signal indicator is to produce a signal on the lead 32 that corresponds to the lead 28 having the highest signal level. Reject output 34 contains a signal when there is an insufficient difference in signal levels between the largest and second largest signals on leads 28.

A group of difference amplifiers 40 perform subtraction of the voltage developed on each input from the voltage developed on each other input. A signal is present on lead 42 if $E_0-E_1$ is positive. Similarly, a signal is present on lead 44 if $E_0-E_2$ is positive. A group of inverters 58 and designated by blocks labelled I provides outputs indicative of the reverse of the difference amplifier subtractions. Therefore, no difference amplifier is required for $E_1-E_0$, $E_2-E_0$, etc. This halves the number of difference amplifiers required (compare to the number needed if all subtractions were performed by difference amplifiers and no inverters were used).

A limiting circuit 46, designated in FIGURE 3 by the label LIM, is connected to the output of each difference amplifier 40. FIGURE 4 is a circuit diagram of a limiter that may be used in the circuit of FIGURE 3. Batteries 47 determine the voltage levels at which diodes 49 conduct to limit the input signal. The battery voltage are equal and depend upon the signal input level required to operate the "and" gates 48 to which the limiter outputs are applied. The "and" gate 48, designated by the label AND (FIGURE 3) may be formulated by a "Christmas tree" arrangement of any well-known variety of two-input "and" gates or a single multiple-input (nine-input) "and" gate, as for example, the type shown in FIGURES 13–8 of Jacob Millman and Herbert Taub, Pulse and Digital Circuits, 1956. Nine-lead cables are shown on FIGURE 3, rather than nine separate leads, to simplify the drawing. Each limiter 46 output is applied directly to one "and" gate 48 and through an inverter to a second "and" gate, thereby halving the number of difference amplifiers required.

If any limiter output 46 is negative, zero, or less positive than the "and" gate 48 reference voltage (the voltage which all inputs must equal or exceed to cause the gate to operate), the output of the "and" gate is blocked. This indicates that the diffraction pattern of the reference pattern is not similar to the diffraction pattern of the specimen to be identified. The "and" gate reference voltage determines the amplitude of the voltages from the difference amplifiers and limiters required for operation. Therefore, this voltage determines the sensitivity of the pattern recognition system as it determines the minimum amount of difference in correlation between the closest and next closest match that will provide "and" gate operation and thus an identification indication. The use of limiters preceding the "and" gates provides more stable "and" gate operation. Since the limiter battery voltages are equal to the reference voltage of the "and" gates, all signals are limited to the level necessary to operate the "and" gates.

A reject output signal is developed on lead 34 when no reference pattern is recognized as comparing to the input specimen. This is accomplished by applying the "and" gate outputs 32 through individual inverters 52 to an "and" gate 54. If any output 32 is present, the associated inverter 52 produces an inhibit signal to "and" gate 54, inhibiting the reject output 34.

As can be seen in the photographs in FIGURE 2, the diffraction patterns obtained for an input specimen "6" and an input specimen "9" are identical if the two input specimens are reflected images of each other. This problem is obviated by using input specimens that are not reflected images of each other (such as by utilizing a "9" without the lower curved portion).

Specimen identification using diffraction pattern masking rather than direct pattern masking has the advantage of registration invariance. Thus, a machine using this scheme of identification could identify specimens misregistered vertically and/or horizontally. This ability of the equipment is of considerable importance when the identification apparatus is operated for identifying typed or printed specimens that are not in close registration. This scheme of specimen identification is also of considerable utility where the patterns appear in displaced positions, such as would occur in apparatus for identifying printing on an envelope in a mail sorting apparatus.

While the invention has been particularly shown and described with reference to a preferred embodiment thereof, it will be understood by those skilled in the art that various changes in form and details may be made therein without departing from the spirit and scope of the invention.

What is claimed is:

1. A specimen identification apparatus comprising in combination: a surface that is relatively opaque throughout except for relatively transparent areas having the shape of the specimen to be identified; a source of coherent light directed toward the surface; a translucent member located behind said surface for displaying a Fraunhofer intensity diffraction pattern of the specimen; and means for optically comparing the pattern on the member while the diffraction pattern is being generated with reference diffraction patterns for identifying the specimen.

2. A specimen identification apparatus comprising in combination; a surface that is relatively transparent throughout except for relatively opaque areas having the shape of the specimen to be identified; a source of coherent light directed toward the surface; a translucent member located behind said surface for displaying a Fraunhofer intensity diffraction pattern of the specimen, and means for optically comparing the pattern on the member while the diffraction pattern is being generated with reference diffraction patterns for identifying the specimen.

3. A specimen identification apparatus comprising in combination: a surface that is relatively opaque throughout except for relatively transparent areas having the shape of the specimen to be identified; a source of coherent light directed toward the surface; a translucent member located behind said surface for displaying a Fraunhofer intensity diffraction pattern of the specimen; means for simultaneously directing the pattern on the member toward a plurality of masks having transparent areas dependent upon diffraction patterns of reference characters; a light-sensitive element located behind each mask; normalizing means located in the paths of direction of the pattern; and signal indicating means; whereby the intensity of light impinging upon the light-sensitive means provides an identification of the specimen.

4. A specimen identification apparatus comprising, in combination; a surface that is relatively transparent throughout except for relatively transparent areas having the shape of the specimen to be identified; a source of coherent light directed toward the surface; a translucent member located behind the surface for displaying a diffraction pattern of the specimen; an adjustable interference filter located between the source of light and the surface for controlling the frequency of light directed toward the surface; means for simultaneously directing the pattern on the member toward a plurality of masks having transparent areas dependent upon diffraction patterns of reference characters; a light-sensitive element located behind each mask to develop a voltage dependent upon the intensity of light impinging upon said element; normalizing means located in the paths of direction of the pattern; difference means, including limiting means, to develop outputs dependent upon the differences between the voltages developed by each pair of light-sensitive means; a plurality of coincidence means utilizing selected outputs of said difference means to provide an indication of the light-sensitive element developing the largest voltage when there is a sufficient difference between the largest and second largest of said voltages, and to provide a reject indication when said difference is insufficient; whereby the specimen is identified if similar to only one of the reference characters.

5. A method of identifying a specimen comprising the steps of: generating a pattern of energy corresponding to the square of the Fourier transform of the specimen to be identified; imaging the generated pattern of energy on a plurality of masks, each corresponding to a function of the square of the Fourier transform of a reference pattern; and sensing the energy passing through each mask to provide an indication of the identity of the specimen, whereby registration invariant specimen identification is achieved.

6. A method of identifying a specimen comprising the steps of: generating a diffraction pattern of energy corresponding to the specimen to be identified; imaging the generated pattern of energy on a plurality of masks, each corresponding to a function of a diffraction pattern of a reference pattern; and sensing the energy passing through each mask to provide an indication of the identity of the specimen, whereby registration invariant specimen identification is achieved.

7. A specimen identification apparatus comprising in combination: means for generating a Fraunhofer intensity diffraction pattern of energy corresponding to the specimen to be identified; means for imaging the generated pattern of energy on a plurality of masks each corresponding to a function of the Fraunhofer intensity diffraction pattern of a reference pattern; and means for sensing the energy passing through each mask to provide an indication of the identity of the specimen, whereby registration invariant specimen identification is achieved.

8. A method of identifying a specimen comprising the steps of: optically generating a Fraunhofer intensity diffraction pattern of energy corresponding to the specimen to be identified, comparing the diffraction pattern of energy with diffraction patterns of reference patterns by imaging the diffraction pattern of energy on reference diffraction pattern masks, and measuring the amount of light passing through the masks to identify said specimen, whereby registration invariant specimen identification is achieved.

9. A specimen identification apparatus comprising in combination: means for generating a variable-size Fraunhofer intensity diffraction pattern of energy corresponding to the specimen to be identified; means for imaging the generated pattern of energy on a plurality of masks each corresponding to a function of the Fraunhofer intensity diffraction pattern; and means for sensing the energy passing through each mask to provide an indication of the identity of the specimen, whereby registration invariant specimen identification is achieved.

References Cited in the file of this patent

UNITED STATES PATENTS

| | | |
|---|---|---|
| 2,712,415 | Piety | July 5, 1955 |
| 2,733,631 | McLachlan | Feb. 7, 1956 |

OTHER REFERENCES

Howell: "A Table Model Projector for the Bragg-Huggins Masks," Review of Scientific Instruments, vol. 26, No. 1, page 93, January 1955.

Howell: "Optical Analog Computers," Journal of the Optical Society of America, vol. 49, No. 10, October 1959.